(No Model.)

C. SORLEY.
SECONDARY OR STORAGE BATTERY.

No. 341,860. Patented May 11, 1886.

WITNESSES:
Gustave Dieterich
Fred'k Huetwohl

INVENTOR
Charles Sorley
BY
Geo. H. Benjamin
ATTORNEY

UNITED STATES PATENT OFFICE.

CHARLES SORLEY, OF NEW YORK, N. Y.

SECONDARY OR STORAGE BATTERY.

SPECIFICATION forming part of Letters Patent No. 341,860, dated May 11, 1886.

Application filed January 19, 1885. Serial No. 153,308. (No model.)

*To all whom it may concern:*

Be it known that I, CHARLES SORLEY, of the city, county, and State of New York, have invented certain new and useful Improvements in Secondary or Storage Batteries; and I do hereby declare the following to be a full, clear, and exact description of the invention, such as will enable others skilled in the art to which it pertains to make and use it, reference being had to the accompanying drawings, which form part of this specification.

My invention relates to that class of batteries which primarily generate no electric current of themselves, but which, when submitted to the action of an electric current from a suitable generator passing through the battery, have their electrodes so acted upon that they are chemically altered, or, so to speak, become charged and put into condition to give off currents of electricity upon connecting the poles of the battery by a conductor, and to continue to furnish such currents until the chemical composition of the electrodes or material upon the electrodes has again been altered and a condition of electrical equilibrium established.

My invention consists in a secondary-battery plate or element formed from a narrow strip of sheet-lead so bent upon itself as to form a series of convolutions, which, when bound together, make a plate having upon its faces, and between the convolutions of the lead, receptacles for the reception of the material active in the battery, the object of the invention being to improve the element and to give it large active surface within a comparatively small space and with diminished weight, and, further, to prevent the bending or buckling of the plate or element when in use.

My invention also relates to a non-oxidizable terminal for use in connection with the elements of a storage-battery.

The subject-matter herein claimed as my invention is first specifically described in detail, and then particularly pointed out in the specification.

Figure 1:
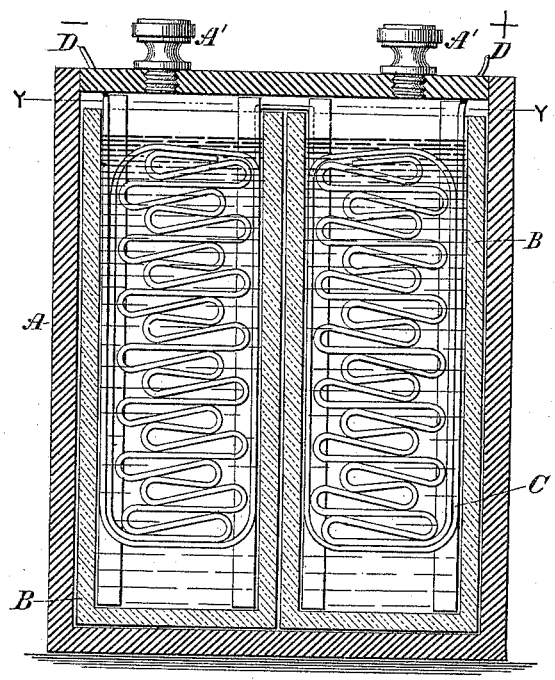
Figure 4:
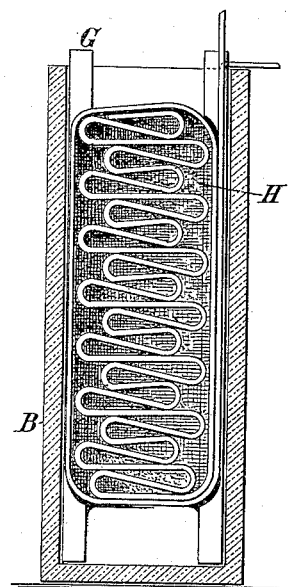
Figure 2:
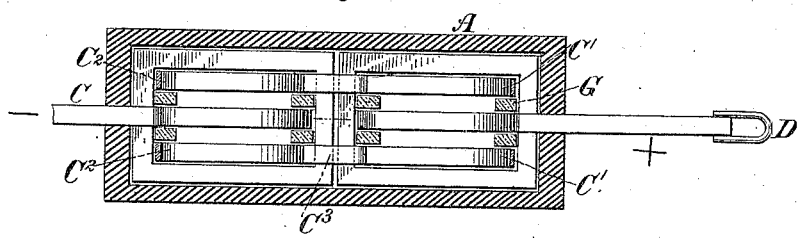
Figure 3:
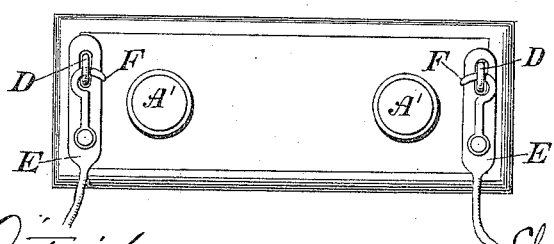

Figure 1 is a vertical section of a storage-battery formed according to my invention, the plates or elements therein being shown in elevation and without the active material between the convolutions of the lead. Fig. 2 is a horizontal section taken on the line Y Y of Fig. 1, and also shows the method of connecting the plates with the terminal loops. Fig. 3 is a top view of the battery-case, showing conducting-leads connected to the terminal loops. Fig. 4 is a vertical section of a glass containing-cell, showing an electrode in elevation as fully formed, with the active material between the convolutions of the lead.

In all batteries of this class, as heretofore constructed, the electrodes, so far as I am aware, have been formed from plates or sheets of rolled or cast lead, and the material active in the battery applied either to the surface of the plates packed into cells or receptacles formed therein or packed on and between ribs, projections, or corrugations formed on the surface of the plates, the object in each instance being to form an electrode having as large an extent of active surface as it is possible to attain, and which by its method of construction will, under the exigencies of actual use, retain its proper form and position in the battery-cell, and also its active surface, by keeping the active material in its proper position on the plate.

Experience has demonstrated in the practical use of all electrodes formed as described that the active material will not retain its position upon the surface of the plates, it being separated therefrom by various causes, among which are heating of the plates, buckling and bending, and also local action. The separation and gravitation of the active material tend to set up counter-currents in the battery-cell, or to form short circuits between the opposing electrodes. Where the active material is mechanically applied to the surface of plates or between ribs or projections on the surface of the plates, it has been found that electrodes so formed will not keep their shape, for the reason that the active material contained on the surface of the supporting-plate and the material of the plate itself absorb heat in different proportions, and as a consequence unequal expansion and contraction of the materials result, and the plates soon lose their form and are rapidly destroyed or rendered useless.

In order to overcome the difficulties as herein stated, I have constructed a battery plate or element from a strip of sheet-lead, and in the manner which I will now proceed to describe.

I first cut from a sheet of lead a narrow strip of any required length, and then bend it upon itself in such a manner as to form a series of convolutions, which may be of any size or shape. These convolutions are placed together in such a manner as to form a plate of the required size, and the lead strip carried round its outer edge for the purpose of securing the convolutions together, the end of the strip being carried upward to form a terminal. A plate so formed must necessarily have a large number of interspaces between the convolutions of the lead strip. These interspaces form receptacles, into which I pack the material active in the battery. I thus produce an electrode having a very large extent of active surface, and one which will not bend or buckle when in use, for the reason that the sustaining-plate made up of the convolutions of the lead strip is in no sense rigid, and any expansion due to the absorption or generation of heat by either the active material or the sustaining body can readily take place in any direction without altering the configuration of the electrode.

Electrodes formed as described are placed in cells containing an electrolytic liquid in the manner as shown in Fig. 1—that is, the surfaces of the plates are opposed to each other in the usual manner; but the surfaces of the plate formed according to my invention are made up of the edges of the lead strip which form the plate.

In other forms of battery where lead plates are used the rolled or cast surfaces of the plate are opposed to each other. In my plate it is the surfaces at right angles to the rolled or cast surfaces which are opposed.

In constructing my electrodes I form the plate or sustaining-body first, and then subject it to a preliminary charging, and I thus produce a coating of peroxide of lead upon the positive plate and a slight roughening or change of condition of the negative plate, after which I insert the active material in the form of a thick paste, pressing it firmly into the receptacles between the convolutions of the lead strip. The object of the preliminary charging is to give the lead plates a surface to which the active material will adhere. The electrodes as thus formed are now in a condition to be inserted into the containing-cells, and ready to receive the current which they are designed to contain or store.

The method of arranging the plates within the containing-cells, where two or more cells are used, and that which I prefer to use, is shown in Figs. 1 and 2. The right-hand terminal, through which the current is led into the battery, is marked +, and the left-hand terminal, through which the current is led from the battery, is marked —. On each side of these two plates are the plates C' C' C'' C'', those marked C' being negative, and those C'' positive. Pairs of these plates are connected together by the lead strips, as shown in C³. This method of connection materially simplifies the mechanical construction of batteries made up of two or more cells.

Referring to the drawings, A represents the containing-case, which may be of wood, rubber, or any other suitable material, and provided at the top with the screw-threaded plugs or stoppers A' A', which can be removed for the purpose of inserting a fresh supply of the electrolytic liquid used, or to allow the escape of gas in charging. B B are small glass cells for containing the electrodes.

C represents a plate or element formed according to my invention, consisting of a narrow strip of lead bent upon itself in such a manner as to form a series of convolutions, the same lead strip being continued around the outer edge of a plate formed of said convolutions, for the purpose of binding them together and to give the desired shape to the plate. In order to make the plate more firm, the convolutions can be soldered together at different points. The end of the lead strip is carried upward, and on it are fastened by soldering the loops D D. These loops I prefer to make of any non-oxidizable material—such as platinum, or other material which is a good conductor—the object of forming the loops of non-oxidizable material being to prevent the corrosion of the terminals by means of creeping of the electrolytic liquid or by the precipitation of the bubbles of gas and acid thereon formed in charging the cell. Another object in forming the terminals as loops is shown in Fig. 3. A terminal so formed can be united so as to make a good connection with the leading-in wires by means of plates E and hooks F, attached to the end of the wires in the manner shown at Fig. 3.

In the drawings, Fig. 4, is shown a completely-formed electrode, H indicating the active material packed in between the convolutions of the lead-sustaining plate C. G are strips of glass inserted between the electrodes for the purpose of separating them and retaining them at the required distance apart.

Referring to the method of connecting the electrodes where two or more cells are used, it will be noticed that it possesses the advantage of, so to speak, isolating each separate plate or electrode, and any injury occurring to a single plate will only short-circuit the pair of plates which are opposed, and not the whole battery, as is now the case where all the electrodes are connected together by independent terminals.

I reserve the right to claim in a future application or applications the process of forming or treating secondary-battery elements, and also a non-oxidizable terminal for secondary-battery elements, substantially as disclosed in this patent and not specifically claimed herein.

I claim as my invention—

1. A secondary-battery element or electrode having its body, support, or frame formed from convolutions of a narrow strip of lead, the edges of which form the surfaces of the plate, substantially as and for the purpose set forth.

2. In a secondary battery, an element or electrode having its body, support, and frame formed from a narrow strip of lead bent or turned upon itself to form a series of convolutions united together to form a plate, substantially as described.

3. In a secondary battery, an element or electrode having its body, support, or frame formed from a narrow strip of lead bent or turned upon itself to form a series of convolutions and united to form a plate, the edges of said strip being on the surface of said plate, substantially as described.

4. In a secondary battery, the combination, with one cell thereof, of two or more plates or elements formed from narrow strips of lead bent or turned upon themselves to form a series of convolutions and united to form plates, and wherein the edges of said strips are on the surfaces of the said plates and opposed to each other, substantially as described.

5. A secondary-battery element or electrode having its frame, support, or body formed of convolutions of a strip of lead and provided with interspaces and receptacles between the said strips and entirely through the body of the plate.

6. A secondary-battery element or electrode having its supporting-body made up of convolutions of a continuous strip of lead united to form a plate, the edges of said strip forming the surfaces of the plate, and one end of said strip carried upward to form a terminal, substantially as described.

7. In a secondary-battery, a plate or element formed from a narrow strip of lead bent or turned to form a series of convolutions, in combination with a terminal of non-oxidizable material attached to the end of said strip, substantially as described.

8. In a secondary battery, an element or electrode having its supporting-body made up of convolutions of strips of lead, in combination with the loop of non-oxidizable material attached to one end of said leaden strip, substantially as described.

9. The combination, in a storage-battery made up of two or more cells, of a positive plate and a negative plate arranged opposite to each other in separate cells and each provided with terminals, and a pair of plates in each cell arranged on each side of the plate to which the terminal is attached and of opposite polarity, the plates arranged opposite to each other in each cell connected together or formed from continuous bendings of the same lead strip, substantially as described.

In witness whereof I have hereunto subscribed my name this 26th day of December, A. D. 1884.

CHARLES SORLEY.

Witnesses:
W. G. McCosmon,
Geo. H. Benjamin.